United States Patent [19]
Ueda et al.

[11] Patent Number: 5,376,870
[45] Date of Patent: Dec. 27, 1994

[54] APPARATUS FOR DRIVING A BRUSHLESS DC MOTOR

[75] Inventors: Eiji Ueda, Katano; Toshio Inaji, Minoo, both of Japan

[73] Assignee: Matsushita Electric Industrial Co., Ltd., Osaka, Japan

[21] Appl. No.: 13,379

[22] Filed: Feb. 4, 1993

[30] Foreign Application Priority Data

Feb. 10, 1992 [JP] Japan ................. 4-023491
Apr. 10, 1992 [JP] Japan ................. 4-090546

[51] Int. Cl.$^5$ ............................. H02P 1/16
[52] U.S. Cl. ..................... 318/603; 318/799; 318/779; 318/254
[58] Field of Search ......... 318/602, 603, 799, 809, 318/437, 448, 254, 439, 137, 778, 779

[56] References Cited

U.S. PATENT DOCUMENTS

| | | | |
|---|---|---|---|
| 4,563,625 | 1/1986 | Kornbrekke et al. | 318/602 X |
| 4,641,066 | 2/1987 | Nagata et al. | 318/254 |
| 4,831,510 | 5/1989 | Dummermuth et al. | 318/603 X |
| 5,013,988 | 5/1991 | Sakano | 318/602 |
| 5,124,625 | 6/1992 | Wakabayashi | 318/603 |
| 5,196,775 | 3/1993 | Harris et al. | 318/799 X |
| 5,216,346 | 6/1993 | Murakami | 318/603 |

FOREIGN PATENT DOCUMENTS

0313046 4/1989 European Pat. Off.

OTHER PUBLICATIONS

Patent Abstracts of Japan, vol. 013, No. 081 (E-719) 23 Feb. 1989 & JP-A-63 262 088 (Sony Corp.) 28 Oct. 1988 * abstract *.

Primary Examiner—William M. Shoop, Jr.
Assistant Examiner—Brian Sircus
Attorney, Agent, or Firm—Wenderoth, Lind & Ponack

[57] ABSTRACT

A brushless DC motor driving apparatus for a brushless DC motor which includes a rotor possessing a plurality of magnetic poles, a stator, and a stator winding with plural phases provided on the stator at a specific gap with respect to the rotor, the apparatus including: a sensor for generating sensor signals of plural phases showing a state of rotation of the rotor depending on the rotation of the rotor; a direction detector for detecting a rotating direction of the rotor from the sensor signals of plural phases and for outputting a direction signal; an initial phase detector for outputting a first phase signal depending on the direction signal and for producing an initial count value corresponding to a position of the rotor; a counter for setting an initial value corresponding to the initial count value, and for increasing or decreasing the count value depending on the direction signal and at least one of the sensor signals and for outputting a second phase signal; a waveform generator for generating a position signal of plural phases depending on the first phase signal or the second phase signal, and a power supply circuit for supplying electrical power to the stator winding depending on the position signal of plural phases.

10 Claims, 8 Drawing Sheets

APPARATUS FOR DRIVING A BRUSHLESS DC MOTOR

BACKGROUND OF THE INVENTION

1. Field of the Invention

The present invention relates to an apparatus for driving a brushless DC motor, and more particularly to an apparatus for driving a brushless DC motor which does not require a position sensor for detecting the rotating position of a permanent magnet rotor.

2. Description of the Prior Art

The brushless DC motor is longer in life and lower in electric noise level as compared with a DC motor with brushes because it has no mechanical contact. It is accordingly used widely in industrial equipment and video and audio equipment where high reliability is required.

Conventionally, the brushless DC motor of this type used a position sensor (for example, a Hall effect element), which corresponds to the brush, for changing over the conductive phases of the stator windings. The position sensor itself is not inexpensive, and it requires a complicated adjustment of the mounting position of the sensor and an increase in the total amount of wiring, which results in a much higher cost of the brushless DC motor as compared with a DC motor with brushes. Besides, the motor structure is often limited because the position sensor must be assembled in the motor. Recently, in the downsizing trend of appliances, the motor is becoming smaller and thinner, and a position for mounting the position sensor such as the Hall element, is not sufficiently available. Accordingly, several brushless DC motors without position sensors have been so far proposed.

As a brushless DC motor without a position sensor, for example, a motor using an output signal of a frequency generator attached to the motor is known. That is, the output pulses of the frequency generator for generating pulses depending on the rotation of the rotor are counted by a counter, and drive currents of a preset current pattern are sequentially passed to three-phase stator windings depending on the count value, thereby rotating the permanent magnet rotor (for example, see Japanese Patent Publication No. 63-262088).

In such a configuration, however, since the initial position of the rotor is not known when turning on the power, a special reset signal generating circuit is provided in the brushless DC motor as shown in the above prior art, and the counter is reset by the reset signal when the power is turned on, while a specific reset current is supplied to the stator windings so that the rotor and the stator windings may be preliminarily set in a specific positional relationship.

However, when the specific reset current is supplied to the stator windings in order to determine the initial position, the rotor begins to rotate, and the position of the rotor oscillates about the specified position, and not standing still at the specified position for a short time. As a result, the starting time is long because the operation cannot be transferred in a short time from the reset mode for supplying the specific reset current to the stator windings when turning on the power to stop the rotor at the specified position, to the normal position detecting mode for counting the output pulses of the frequency generator depending on the rotation of the rotor.

It cannot be therefore used in applications requiring a short starting time such as machines repeating rotating and stopping frequently.

In the brushless DC motor in the above prior art, since the rotor is rotated forcedly to a specified position in the reset mode, the rotor may largely rotate reversely depending on the initial position of the rotor. Hence, it can be used only in machines allowing a wide reverse rotation, and the scope of application is considerably limited.

Furthermore, in the brushless DC motor in the above prior art, if the relative positions of the rotor and stator windings are set in the specified relationship in the reset mode, if the rotor is loaded, the relative positions of the rotor and stator windings may vary largely depending on the magnitude of the load. Hence, the rotor may not be fixed at the specified position in the reset mode.

Therefore, in the brushless DC motor shown in the above prior art, when the reset mode is transferred to the normal position detecting mode for counting the output pulses of the frequency generator depending on the rotation of the rotor, the current phase supplied to the stator windings is largely deviated from the normal phase, and a high efficiency drive cannot be realized. Therefore, the brushless DC motor shown in the prior art is usable only in an application in which the motor is unloaded when the power is turned on.

SUMMARY OF THE INVENTION

It is hence a primary object of the invention to present a brushless DC motor driving apparatus for detecting a positional relationship between the rotor and the stator winding in a short time when the power is turned on, and for promptly changing over from the phase matching mode when the power is turned on to the normal position detecting mode for counting the output pulses produced depending on the rotation of the rotor.

Another object of the invention is to detect the position of the rotor precisely regardless of the magnitude of the load if the motor is already loaded when the power is turned on, and further to detect the position of the rotor within a remarkably small amount of rotation of the rotor. It is therefore another object to present a brushless DC motor driving apparatus capable of driving a motor at a high efficiency although no position sensor is needed, and applicable to a wide scope of applications.

To achieve the above objects, the invention provides a brushless DC motor driving apparatus for driving a brushless DC motor which includes a rotor possessing a plurality of magnetic poles; a stator; a stator winding with plural phases provided on the stator at a specific gap with respect to the rotor, said driving apparatus comprising: sensor means for generating sensor signals of plural phases showing a rotational state of the rotor depending on a rotation of the rotor; a direction detecting means for detecting a rotating direction of the rotor from the sensor signals of plural phases and for producing a direction signal; initial phase detecting means for producing a first phase signal depending on the direction signal and for detecting an initial count value corresponding to a position of the rotor; a counter means for setting an initial value corresponding to the initial count value; and for increasing or decreasing a count value depending on the direction signal and at least one of the sensor signals, and for producing a second phase signal; a waveform generating means for generating a position signal of plural phases depending on the first phase signal or the second phase signal, and a power supply means for supplying electric driving apparatus for driving a brushless DC motor which includes power to the stator winding depending on the position signal of plural phases.

Having the above configuration, the counter means of the brushless DC motor driving apparatus of the present invention counts the output signals of the sensor means which are generated in accordance with the rotation of the rotor. Since the position signal is produced on the basis of this count value, a position sensor required in the conventional brushless DC motor is not needed.

Therefore, unlike the conventional brushless DC motor, the position sensor is not needed, and the complication in the adjustment of the mounting position of the sensor and the amount of wiring can be reduced, so that there can be significant cost savings.

Besides, since the position sensor is not needed in the motor, the motor is not limited structurally, and can be further reduced in size and thickness.

Furthermore, the initial phase detecting means produces the first phase signal depending on the rotating direction of the rotor, while the waveform generating means produces the position signal depending on the first phase signal, thereby detecting the position of the rotor. Hence, the position of the rotor can be detected by a small extent of rotation, not depending on the initial position of the rotor. The position of the rotor can be detected accurately even if the rotor is loaded.

DESCRIPTION OF THE PREFERRED EMBODIMENTS

Figure 1:
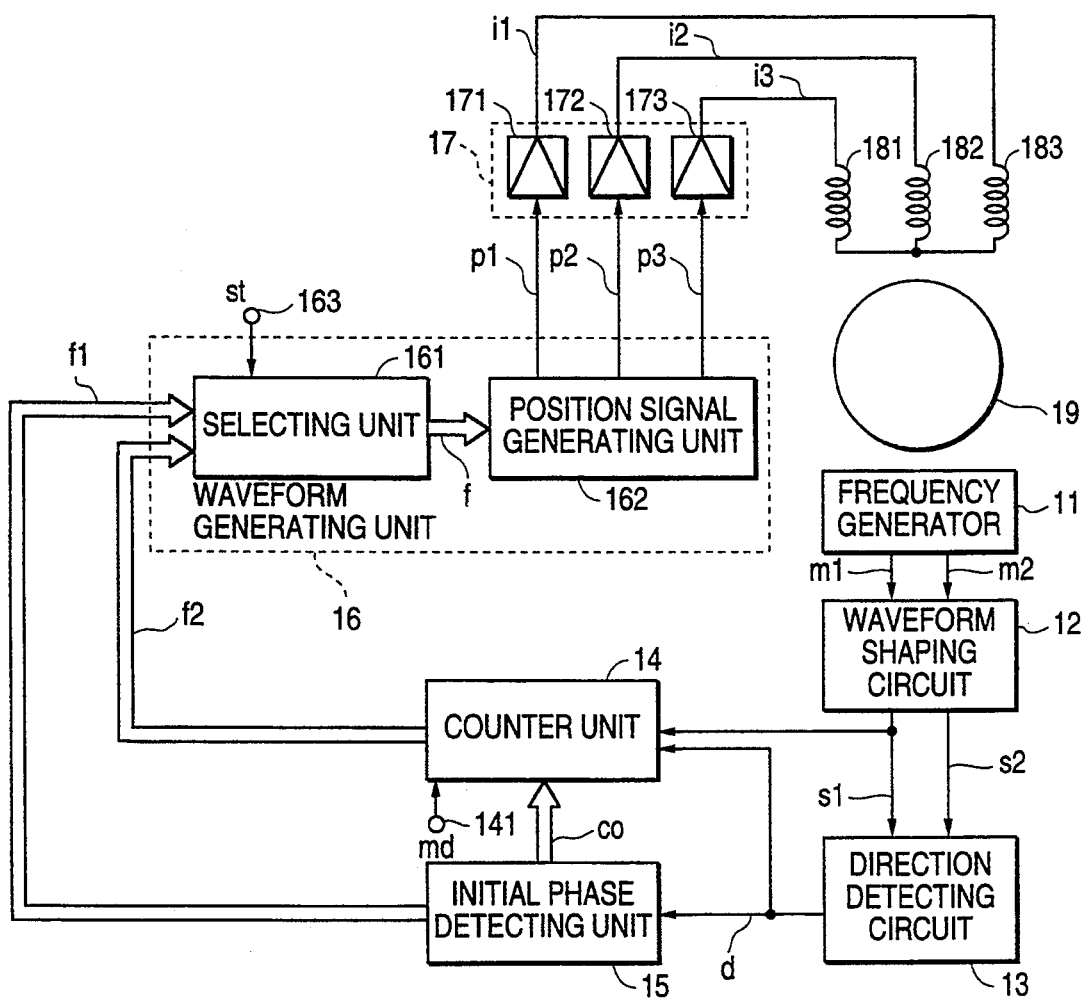
FIG. 1 is a block diagram showing an embodiment of a brushless DC motor driving apparatus in accordance with the present invention.

Referring now to the drawings, some of the embodiments of the brushless DC motor driving apparatus of the present invention are described in detail below.

Figure 13A:
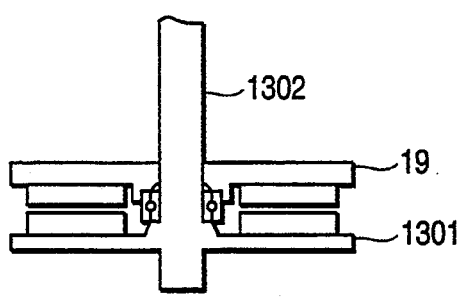
FIG. 13(a) is a sectional view showing an arrangement of the permanent magnet rotor and stator windings.
Figure 13B:
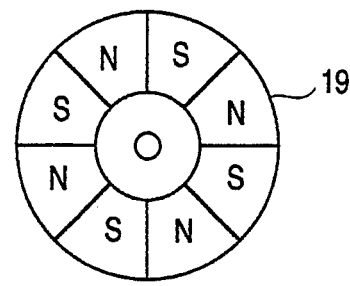
FIG. 13(b) is a plan view of the permanent magnet rotor.
Figure 13C:
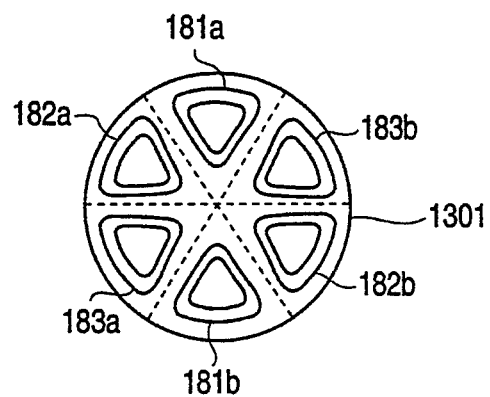
FIG. 13(c) is a diagram showing an arrangement of the stator windings.

FIG. 1 is a block diagram showing a brushless DC motor driving apparatus in accordance with an embodiment of the present invention. A permanent magnet rotor 19 and three-phase stator windings 181, 182, and 183 as shown in FIG. 1 are disposed as shown in FIGS. 13(a)–13(c). In FIG. 13(a), the permanent magnet rotor 19 which rotates together with a rotary shaft 1302 is disposed oppositely to a stator 1301. In the permanent magnet rotor 19, as shown in FIG. 13(b), plural poles (eight poles herein) are disposed in a disc form at equal intervals along the circumferential direction. In the stator 1301, as shown in FIG. 13(c), a plurality of flat windings (six herein) 181a, 182a, 183a, 181b, 182b, and 183b are disposed at equal intervals in a disc form about the rotary shaft 1302 on a flat plane. The flat windings remote from each other by 180 degrees are mutually connected to compose three-phase stator windings 181, 182, and 183. A frequency generator (sensor means) 11 in FIG. 1 generates two-phase frequency signals m1 and m2, which are different in phase from each other, in proportion to the rotation of the permanent magnet rotor 19. The two-phase frequency signals m1 and m2 are fed in a waveform shaping circuit 12 to be converted into square wave signals s1 and s2, and inputted to a direction detecting circuit (direction detecting means) 13. The direction detecting circuit 13 outputs a direction signal d depending on the normal or reverse rotating direction of the permanent magnet rotor 19. A counter unit 14 receives the square wave signal s1 and the direction signal d output by the direction detecting circuit 13, and counts up or counts down the number of pulses of the square wave signal s1 generated depending on the rotation of the permanent magnet rotor 19 according to the rotating direction of the permanent magnet rotor 19. The counter unit 14 outputs the value corresponding to a count value c as a second phase value f2 (second phase signal). An initial phase detecting unit 15 receives the direction signal d of the direction detecting circuit 13, rotates the rotary magnetic field generated in the stator winding at the time of phase matching in the normal or reverse direction depending on the direction signal d, determines the initial position of the permanent magnet rotor 19 by calculation, and outputs an initial count value $c_o$ to the counter unit 14. The initial phase detecting circuit 15 not only outputs the initial count value $c_o$ to the counter unit 14, but also outputs a first phase value f1 (first phase signal) to a selecting unit 161 at the time of phase matching. The selecting unit 161 selects either the first phase value f1 or second phase value f2 depending on the phase matching command st supplied to a terminal 163, and outputs a selected phase value f to a position signal generator unit 162. A waveform generator unit (waveform generating means) 16 is composed of the selecting unit 161 and position signal generator unit 162. The position signal generator unit 162 outputs three-phase position signals p1, p2, and p3 depending on the selected phase value f output by the selector unit 161. A power supply unit 17 receives the three-phase position signals p1, p2, and p3. The three-phase position signals p1, p2, and p3 are amplified by driving amplifiers 171, 172, and 173, respectively, and currents I1, I2, I3, which are proportional to the magnitude of the position signals p1, p2, p3, are supplied to stator windings 181, 182, and 183.

Thus, the brushless DC motor driving apparatus is composed of the permanent magnet rotor (rotor) 19, stator windings 181, 182, and 183, frequency generator (sensor means) 11, direction detecting circuit (direction detecting means) 13, initial phase detector unit (initial phase detecting means) 16, counter unit (counter means) 14, waveform generator unit (waveform generating means) 16, and power supply unit (power supply means) 17.

The operation of the thus composed brushless DC motor, driving apparatus is described in detail below.

Figure 2:
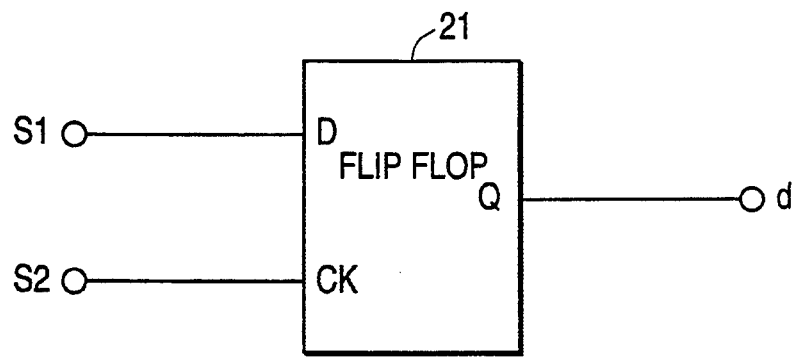
FIG. 2 is a circuit diagram showing an embodiment of a direction detector circuit in accordance with the present invention.

First is explained the case in which the permanent magnet rotor 19 is rotating continuously (position detection mode). FIG. 2 is a circuit diagram in accordance with an embodiment of the direction detecting circuit 13, whose signal waveform diagram is shown in FIGS. 3(a) and 3(b).

In FIG. 2, a D-type flip-flop circuit 21 receives two-phase square wave signals s1 and s2 output by the waveform shaping circuit 12. The square wave signal s1 is fed to a data input terminal D of the flip-flop circuit 21, while the square wave signal s2 is fed to a clock input terminal CK.

Figure 3A:
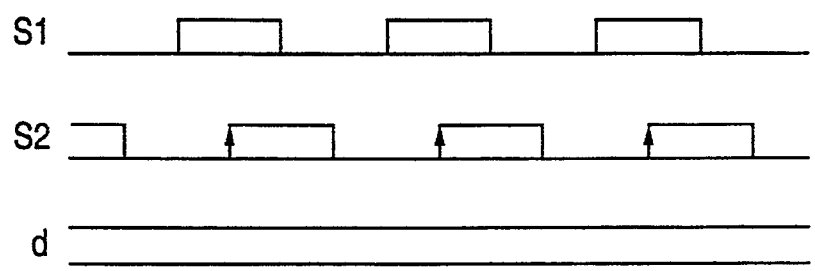
FIG. 3(a) is a waveform diagram showing signals in the direction detector circuit shown in FIG. 2 when the rotor is rotating in the normal direction.
Figure 3B:
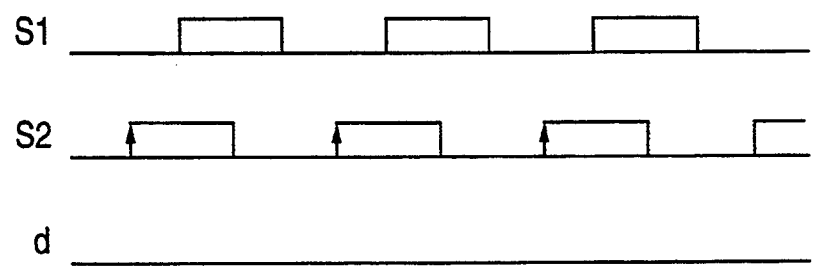
FIG. 3(b) is waveform diagram showing signals in the direction detector circuit shown in FIG. 2 when the rotor is rotating in the reverse direction.

FIG. 3(a) shows square wave signals s1 and s2 when the permanent magnet rotor 19 is rotating in a normal direction, and FIG. 3(b) shows square wave signals s1 and s2 when the permanent magnet rotor 19 is rotating in a reverse direction. The D-type flip-flop circuit 21 holds the state of the data input terminal D at every leading edge of the input signal to the clock input terminal CK, and delivers that state from the output terminal Q.

Therefore, while the permanent magnet rotor 19 is rotating in normal direction as shown in FIG. 3(a), the output Q of the D-type flip-flop circuit 21 is always at a high potential state (hereinafter called the H state). On the other hand, while the permanent magnet rotor 19 is rotating in reverse direction, the square wave signal s1 is behind the square wave signal s2 by 90 degrees as shown in FIG. 3(b), and the output Q is always at a low potential state (hereinafter called the L state).

As clear from the above, the rotating direction of the permanent magnet rotor 19 may be detected by the direction detecting circuit 13 in FIG. 2. That is, the direction signal d of the output of the direction detecting circuit 13 is in the H state while the permanent magnet rotor 19 is rotating in normal direction, and in the L state while rotating in a reverse direction.

The square wave signal s1 delivered by the waveform shaping circuit 12 and the direction signal d of the direction detecting circuit 13 are fed to the counter unit 14, and the counter unit 14 counts up or counts down the pulses of the square waveform signal s1 depending on the direction signal d. That is, the number of pulses of the square wave signal s1 generated depending on the rotation of the permanent magnet rotor 19 is counted up or counted down depending on the rotating direction of the permanent magnet rotor 19, and therefore, the rotation amount of the permanent magnet rotor 19 may be obtained from the count value of the counter unit 14. However, the count value of the counter unit 14 is unstable in the initial state right after turning on the power, and it is necessary to set a proper initial count value $c_o$.

Figure 9:
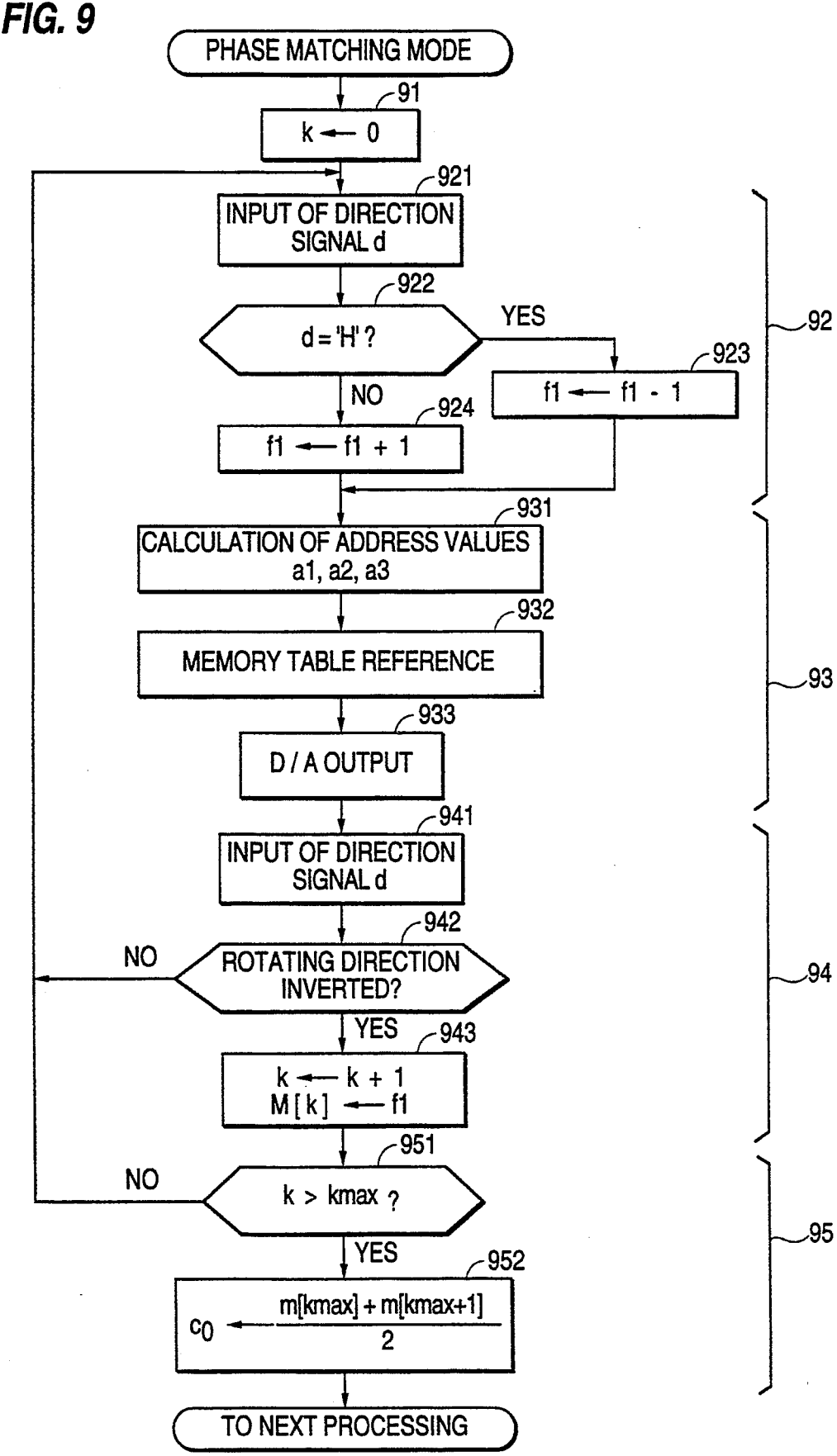
FIG. 9 is a flowchart of an embodiment for a phase matching operation.

The method of setting the initial count value $c_o$ is explained in detail in FIG. 9 in relation to the description of the operation of the phase matching mode.

Figure 4A:
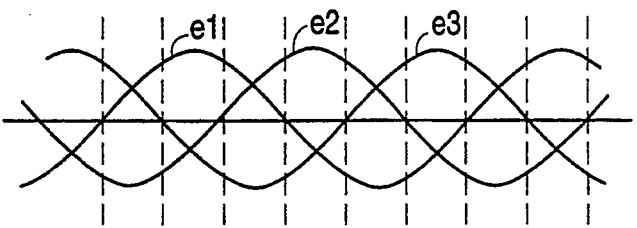
FIGS. 4(a), 4(b) and 4(c) are waveform diagrams showing the generated voltages, a waveform diagram showing the position signals and a waveform diagram showing the drive currents, respectively, during the normal rotation of the brushless DC motor.
Figure 4B:
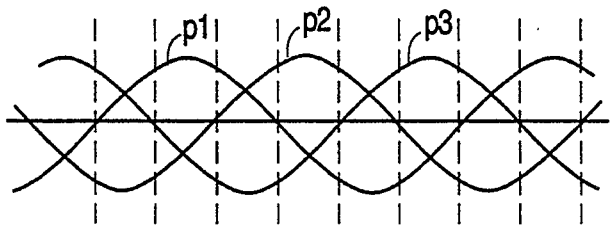
Figure 4C:
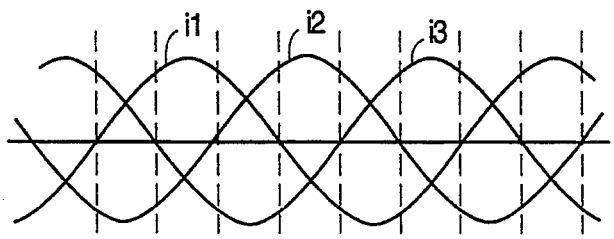

FIGS. 4(a)–4(c) are signal waveform diagrams of various elements during normal rotation of the brushless DC motor of the invention.

In FIG. 4(a), e1, e2, and e3 are generated voltage waveforms induced in stator windings 181, 182, and 183, respectively. On the other hand, p1, p2, and p3 are three-phase position signals produced from the waveform generating unit 16, which are generated to be nearly in phase with the generated voltage waveforms e1, e2, and e3 depending on the rotating position of the permanent magnet rotor 19. The position signals p1, p2, and p3 are sinusoidal signal waveforms, and the power supply unit 17 amplifies the power of the position signals p1, p2, and p3 in three phases, and sinusoidal three-phase drive currents I1, I2, and I3 are supplied to the individual phases of the stator windings 181, 182, and 183. As a result, by the three-phase drive currents I1, I2, and I3, rotary magnetic fields are generated in the stator windings 181, 182, and 183, and by the mutual action of the rotary magnetic field and the magnetic poles of the permanent magnet rotor 19, the permanent magnet rotor 19 receives the rotary force and rotates.

Figure 5A:
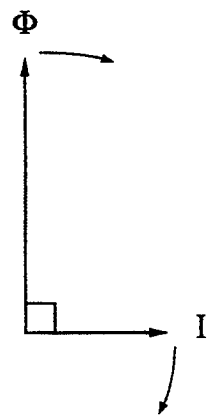
FIG. 5(a) is a vector diagram showing a relationship between the magnetic pole vector Φ of the permanent magnet rotor and the magnetomotive force vector I generated by the stator windings when the brushless DC motor is rotating in the normal direction.
Figure 5B:
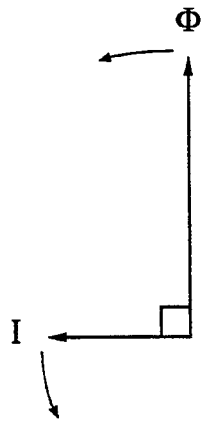
FIG. 5(b) is a vector diagram showing a relation between the magnetic pole vector Φ of the permanent magnet rotor and the magnetomotive force vector I generated by the stator windings when the brushless DC motor is rotating in the reverse direction.

FIGS. 5(a)–5(b) are vector diagrams showing the phase relationship of the magnetomotive force vector of the rotary magnetic fields generated by the stator windings 181, 182, and 183, together with the magnetic pole vector of the permanent magnet rotor 19. In FIGS. 5(a)–5(b), Φ denotes the magnetic pole vector showing the magnetic poles of the permanent magnet rotor 19, and I is the magnetomotive force vector of the rotary magnetic fields generated by the stator windings 181, 182, and 183.

FIG. 5(a) is a vector diagram showing the phase rotation of the magnetic pole vector Φ and the magnetomotive force vector I when the permanent magnet rotor 19 is rotating in the normal direction. FIG. 5(b) is a vector diagram showing the phase relationship of the magnetic pole vector Φ and the magnetomotive force vector I when the permanent magnet rotor 19 is rotating in the reverse direction.

The magnetic pole vector Φ obtains a rotary force by mutual action with the magnetomotive force vector I, and rotates in the direction indicated in FIGS. 5(a)–5(b). Here, in order that the permanent magnet rotor 19 rotates continuously it is necessary to rotate the magnetomotive force vector I in the direction shown in the drawing depending on the rotation amount of the magnetic pole vector Φ. That is, the phase of the magnetomotive force vector I is always advanced in the rotating direction by 90 degrees from the phase of the magnetic pole vector Φ, and the rotation amount of the magnetic pole vector Φ is detected, and the magnetomotive force vector I must be rotated depending on that rotation amount. (The angle on the vector diagram expressing the magnetic pole vector Φ and the magnetomotive force vector I is called the angle expressed by the electric angle.)

Figure 6:
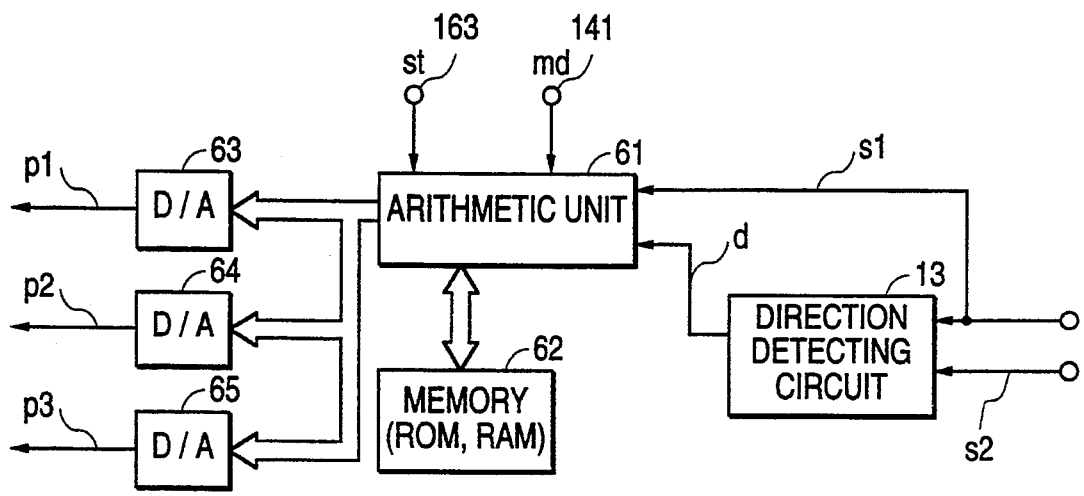
FIG. 6 is a block diagram showing a direction detector circuit, counter unit, initial phase detector, and waveform generator for a brushless DC motor driving apparatus in accordance with the present invention.

FIG. 6 is a block diagram showing an embodiment of the direction detecting circuit 13, counter unit 14, initial phase detecting unit 15, and waveform generating unit 16 for composing the brushless DC motor driving apparatus of the invention.

In this embodiment, the counter unit 14, initial phase detecting unit 15, and waveform generating unit 16 are composed of an arithmetic unit (calculating means) 61, memory 62, and D/A converters (digital-analog converting means) 63, 64, and 65. The arithmetic unit 61 operates according to the specified built-in program mentioned below which is stored in the ROM (read only memory) region of the memory 62, takes in the square wave signal s1, direction signal d, direction command md fed to a terminal 141, and phase matching command st fed to a terminal 163, and calculates as specified by making use of the RAM (random access memory) region, thereby obtaining the selected phase value f. Consequently, depending on the selected phase value f, the arithmetic unit 61 refers to the function table of the sinusoidal wave of one period preliminarily stored in the ROM region of the memory 62, and determines three-phase digital position signals dp1, dp2, and dp3 depending on the selected phase value f, and outputs them to D/A converters 63, 64, and 65, respectively. The D/A converters 63, 64, and 65 convert the three-phase digital position signals dp1, dp2, and dp3 to analog values respectively, and produced three-phase position signals p1, p2, and p3.

The built-in program stored in the ROM region of the memory 62 is described below.

Figure 7:
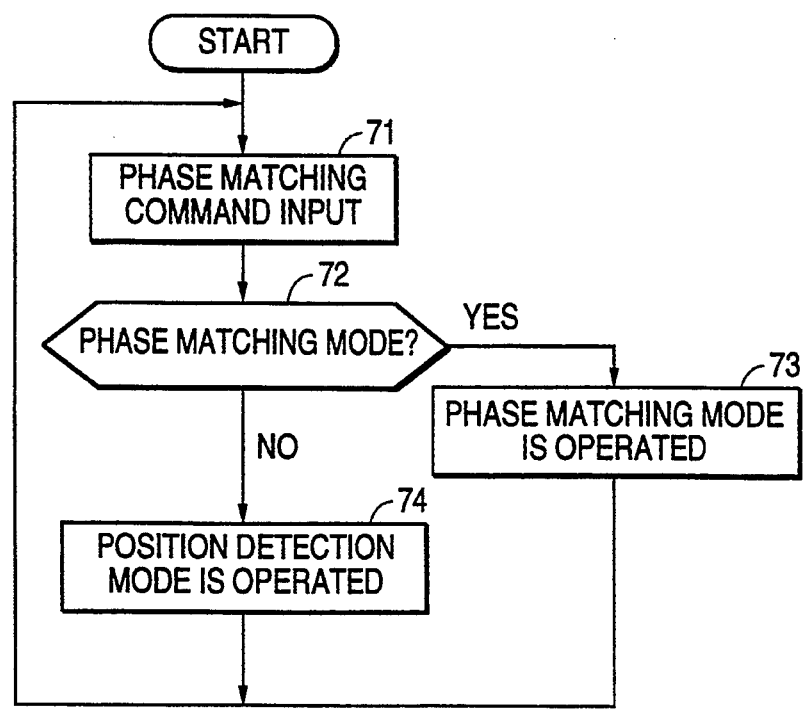
FIG. 7 is a flowchart of an embodiment for operation of the selector in accordance with the present invention.

FIG. 7 is a flowchart of a built-in program for operating the selecting unit (selecting means) 161 of the waveform generating unit 16.

At step 71, the phase matching command st fed in the terminal 163 is entered. Then the processing at step 72 is done.

At step 72, according to the data of the phase matching command st entered at step 71, the selection action in the next step is operated. When the phase matching command st indicates the phase matching mode, the action of the phase matching mode (step 73) is effected. When the phase matching command st does not indicate the phase matching mode, the action (step 74) of the position detecting mode is carried out.

At step 73, the action of the phase matching mode is operated. That is, the action of the initial phase detecting unit 15 and the action of the position signal generating unit 162 of the waveform generating unit 16 are effected, and the position of the permanent magnet rotor 19 is detected, while the initial count value $c_o$ corresponding to the position of the permanent magnet rotor 19 is calculated. Afterwards, the operation returns to the action of the step 71.

At step 74, the action of the position detecting mode is carried out. That is, the action of the counter unit 14 and the action of the position signal generating unit 162 of the waveform generating unit 16 are carried out, and the processing in usual rotation is done. Afterwards, the operation returns to the processing of step 71.

By carrying out these actions, either the action of the phase matching mode or the action of the phase detecting mode is selected depending on the phase matching command st entered in the terminal 163.

That is, depending on the content of the phase matching signal st, either the output signal (second phase value) of the counter unit 14 or the output signal (first phase value) of the initial phase detecting unit 16 is selected as the input of the position signal generating unit 162, and therefore the action of the selector unit (selecting means) 161 is realized by the processing as described above.

Figure 8:
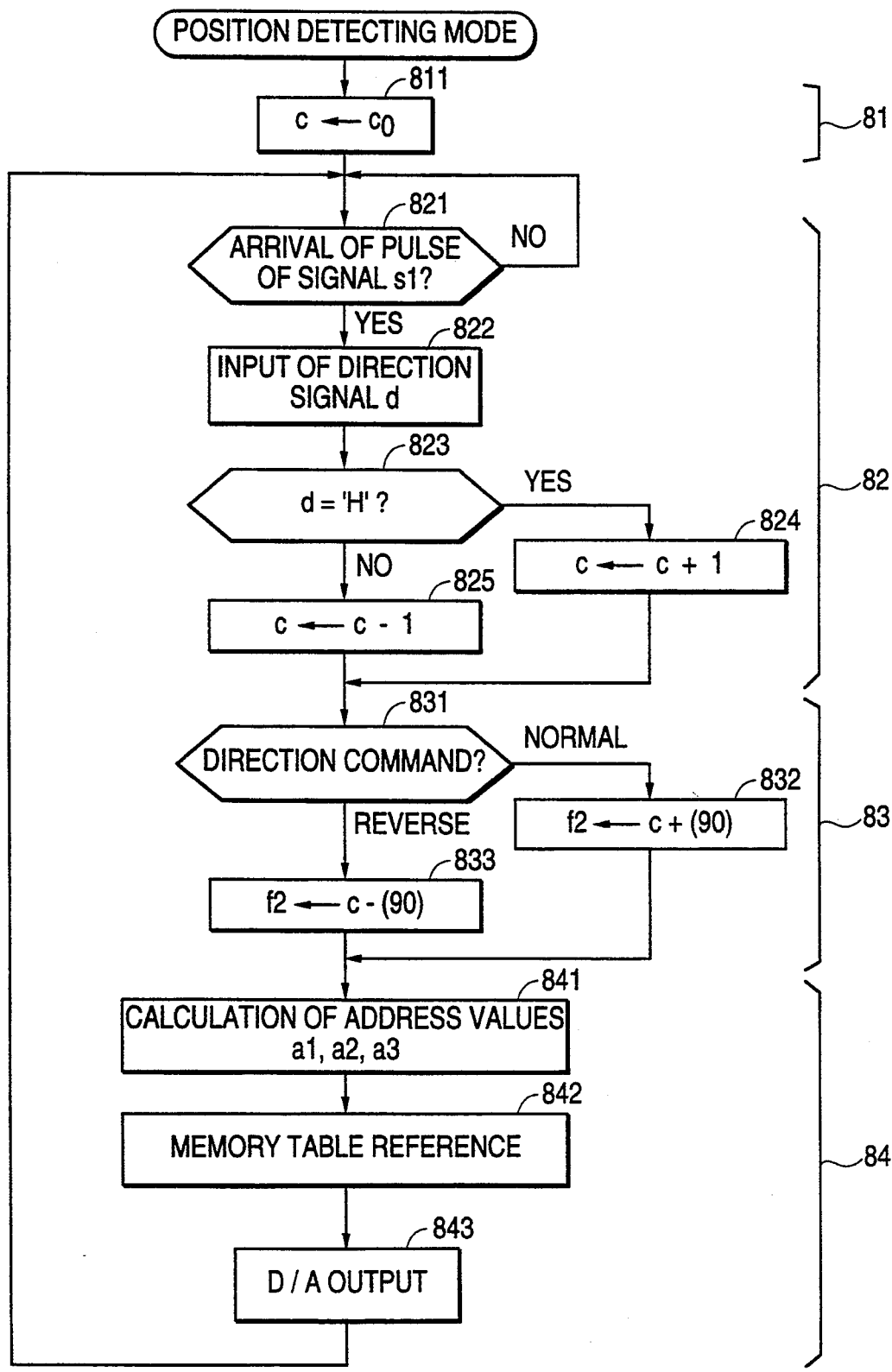
FIG. 8 is a flowchart of an embodiment for processing of the position detecting mode in a usual rotation.

The position detecting mode to be processed at the time of usual rotation is explained below by referring to the flowchart shown in FIG. 8.

At step 811, the initial count value $c_o$ calculated in the phase matching mode is set as the initial value of the count value c. That is, the count value c is set as the value of the initial count value $c_o$. Later, the processing at step 821 is effected. At step 811, the initial value setting part (initial value setting means) 81 is composed.

The step 821 waits for the arrival of the pulse of square wave signal s1. That is, if the pulse has not yet arrived as the square wave signal s1 is entered, the processing of step 821 is repeatedly effected until the pulse arrives. When the pulse of the square wave signal s1 arrives, the processing of step 822 is effected.

At step 822, the direction signal d of the direction detecting circuit 13 is entered. Then the processing of step 823 is effected.

At step 823, when the direction signal d is at an H level, that is, when the permanent magnet rotor 19 is rotating in the normal direction, the processing of step 824 is effected. When the position signal d is at an L level, that is, when the permanent magnet 19 is rotating in the reverse direction, the processing of step 825 is effected.

At step 824, the counting of the count value c is increased by one. That is, a new count valve c is calculated by adding one to the count value c. Then the processing of step 831 is effected.

At step 825, the counting of the count value c is decreased by one. That is, the value 1 is subtracted from the count value c to obtain a new count value c. Then the processing of step 831 is effected.

Here, the count value increase and decrease unit (count value increasing and decreasing means) 82 is composed of step 821, step 822, step 823, step 824 and step 825, and the pulse of the square wave signal s1 is counted up or counted down depending on the direction signal d.

At step 831, the direction command md of the terminal 141 is entered, and when the direction command md is a normal rotation command, the processing of step 832 is effected. When the direction command md is a reverse rotation command, the processing of step 833 is effected.

At step 832, a specific value (a value corresponding to 45 to 135 degrees, preferably 90 degrees, as converted to the rotational angle of the magnetomotive force vector I) is added to the count value c, and the sum is output as the second phase value f2. Then the processing of step 841 is effected.

At step 833, a specific value (a value corresponding to 45 to 135 degrees, preferably 90 degrees, as converted to the rotational angle of the magnetomotive force vector) is subtracted from the count value c to obtain the second phase value f2. Then the processing of step 841 is effected.

Here, the phase adjusting unit (phase adjusting means) 83 is composed of the step 831, step 832, and step 833. The operation of the first counter part (counter means) 14 in FIG. 1 is executed by the initial value setting part (initial value setting means) 81, count value increase or decrease unit (count value increasing or decreasing means) 82, and phase adjusting unit (phase adjusting means) 83.

At step 841, to obtain the position signals p1, p2, and p3, three addresses a1, a2, and a3 for referring to the function table of sinusoidal wave for one period disposed in the ROM region in the memory 62 are calculated. That is, the phases of the position signals p1, p2, and p3, are shifted by 120 degrees each (see FIGS. 4(a)–4(c), and therefore the three addresses a1, a2, and a3 are calculated by the following equations.

$$a1 = f2 \qquad (1)$$

$$a2 = f2 + (120) \qquad (2)$$

$$a3 = f2 - (120) \qquad (3)$$

In the above equations, (120) is the specified address value corresponding to 120 degrees as converted to the rotational angle of the magnetomotive force vector. Then the processing of step 842 is effected.

At step 842, on the basis of the three address values a1, a2, and a3 obtained at step 841, the function table of the sinusoidal wave stored in the ROM region of the memory 62 is referred to, and three-phase digital position signals dp1, dp2, and dp3 are obtained. Afterwards, processing of step 843 is effected.

At step 843, the three-phase digital position signals dp1, dp2, and dp3 obtained at step 842 are delivered to the D/A converters 63, 64, and 65 shown in FIG. 6. In the D/A converters 63, 64, and 65, the digital position signals dp1, dp2, and dp3 are converted to analog values, and position signals p1, p2, and p3 shown in FIGS. 4(a)–4(c) are delivered. Consequently, the operation returns to the processing of step 821.

The position signal output unit (position signal output means) 84 is composed of the step 841, step 842, and step 843. The position signal generating unit 162 in FIG. 1 is composed of the position signal output unit (position signal output means) 84, memory (memory means) 62, and D/A converters (digital-analog converting means) 63, 64, and 65. Furthermore, the waveform generating unit 16 is composed of the selector (selecting means) 161 and position signal transmitter 162 in FIG. 7.

As a result of the above processing, corresponding to the rotation of the permanent magnet rotor 19, the position signals p1, p2, p3 are output to the power supply unit 17. In the power supply unit 17, sinusoidal drive currents i1, i2, and i3 are supplied to the stator windings 181, 182, and 183.

That is, square wave signals s1 and s2 are produced depending on the rotation of the permanent magnet rotor 19. In the direction detecting circuit 13, from these square wave signals s1 and s2, the direction signal d corresponding to the rotation of the permanent magnet rotor 19 is produced. In the count value increasing and decreasing unit 82, the count value c is increased or decreased depending on the square wave signal s1 and direction signal d. While the permanent magnet rotor 19 is rotating normally, the count value c is increased, and while the permanent magnet rotor 19 is rotating reversely, the count value c decreases. That is, the count value c is a value corresponding to the rotation amount of the permanent magnet rotor 19. In the waveform generating unit 16, as position signals p1, p2, and p3, the position signals corresponding to the count value c are delivered. Accordingly, the position signal causes to rotate the phase by the amount corresponding to the rotation amount of the permanent magnet rotor 19.

In this way, the magnetomotive force vector I of the rotary magnetic field and the magnetic pole vector Φ of the permanent magnet rotor 19 always maintain the specific phase difference as shown in FIG. 5(a)–5(b). By the mutual actions of the magnetomotive force vector I and the magnetic pole vector Φ, the permanent magnet rotor 19 receives a torque and continues to rotate.

The initial count value $c_o$ of the initial value setting unit 81 is such a value of the count value c of the counter 14 that the magnetic pole vector Φ and the magnetomotive force vector I may coincide with each other when the specified address value is zero in the phase adjusting unit 83. This initial count value $c_o$ is calculated in the phase matching mode.

On the other hand, in the phase adjusting unit 15, depending on the direction command md, the specified value is added to or subtracted from the count value c to calculate the second phase value f2. By such a calculation, the phase difference of the magnetomotive force vector I of the rotary magnetic field and the magnetic pole vector Φ of the permanent magnet rotor 19 may be set as the phase difference of +90 degrees or −90 degrees depending on the direction command md. Therefore, the permanent magnet rotor 19 may be rotated normally or reversely depending on the direction command md. That is, by varying the direction command md, the rotating direction of the permanent magnet rotor 19 may be easily changed.

In this way, the magnetomotive force vector I of the rotary magnetic field and the magnetic pole vector Φ of the permanent magnet rotor 19 always maintain the phase difference of 90 degrees as shown in FIGS. 5(a)–5(b). By the mutual actions of the magnetomotive force vector I and the magnetic pole vector Φ, the permanent magnet rotor 19 receives a torque and continues to rotate.

However, in the initial state when the power is turned on, for example, the count value c of the counter unit 14 is unstable, and it is necessary to set the initial count value $c_o$ of the count value c.

A detailed explanation follows of the operation of the phase matching mode for setting the initial count value $c_o$ of the counter unit 14 by the brushless DC motor driving apparatus of the invention.

The initial phase detecting unit 15 in FIG. 1 rotates the rotary magnetic field generated in the stator windings 181, 182, and 183 depending on the direction signal d of the direction detecting circuit 13 in the normal or reverse direction when the power source is turned on, and detects the magnetic pole of the permanent magnet rotor 19.

The phase matching mode executed when the power source is turned on or when the count value in the counter unit 14 is improper is explained by reference to the basic flowchart shown in FIG. 9.

At step 91, zero is set as the initial value of the variable k for counting the number of changes of rotating direction of the permanent magnet rotor 19. That is, the value of the variable k is zero. Afterwards, the processing at step 921 is effected.

At step 921, the direction signal d of the direction detecting circuit 13 is entered. Then, the processing of step 922 is effected.

At step 922, when the direction signal d is an H level, that is, when the permanent magnet rotor 19 is rotating in the normal direction, the process of step 923 is effected. When the direction signal d is an L level, that is, when the permanent magnet rotor 19 is rotating reversely, the processing of step 924 is effected.

At step 923, the content of the first phase value f1 is decreased by one. That is, a value obtained by subtracting one from the first phase value fi is set as a new first phase value f1. Then the processing of step 931 is effected.

At step 924, the content of the first phase value f1 is increased by one. That is, the value obtained by adding one to the first phase value f1 is set as a new first phase value f1. Then the processing of step 931 is effected.

Here, the phase value increasing or decreasing part (phase value increasing or decreasing means) 92 is composed of step 921, step 922, step 923 and step 924.

At step 931, to obtain the position signals p1, p2, and p3, three address values a1, a2, and a3 for referring to the function table of the sinusoidal wave for the portion of one period disposed in the ROM region in the memory 62 are calculated on the basis of the first phase value f1. That is, since the phases of the position signals p1, p2, and p3 are individually separated by 120 degrees (see FIG. 4), it follows that $$a1 = f1 \quad (4)$$

$$a2 = f1 + (120) \quad (5)$$

$$a3 = f1 - (120) \quad (6)$$

and the three address values a1, a2, and a3 are calculated. In the above equations, (120) is a specified address value corresponding to 120 degrees as converted to the rotational angle of the magnetomotive force vector. Then the processing of step 932 is effected.

At step 932, on the basis of the three address values a1, a2, and a3 obtained at step 931, referring to the function table of sinusoidal wave stored in the ROM region of the memory 62, three-phase digital position signals dp1, dp2, and dp3 are obtained. Then the process of step 933 is effected.

At step 933, the three-phase digital position signals dp1, dp2, and dp3 obtained at step 932 are sent to D/A converters 63, 64, and 65 shown in FIG. 6. In the D/A converters 63, 64, and 65, the digital position signals dp1, dp2, and dp3 are converted to analog values, and position signals p1, p2, and p3 as shown in FIGS. 4(a)–4(c) are output. Then the processing of step 941 is effected.

Here, the position signal output unit (position signal output means) 93 is composed of the step 931, step 932 and step 933.

At step 941, the direction signal d of the direction detecting circuit 13 is entered. Then the processing of step 942 is effected.

At step 942, if the direction signal d entered in the step 941 is changed from the state one timing before, the processing of step 943 is effected. When the direction signal d is not changed from the state one timing before, the operation returns to the processing of step 921.

At step 943, first one is added to the variable k. That is, the value obtained by adding one to the variable k is set as a new variable k. Next, the value of the first phase value f1 is sequentially stored in the store region M[k] corresponding to the value of the variable k. That is, the value of the store region M[k] is set as the value of the first phase value f1. Then the processing of step 951 is effected.

Here, the phase value storing part (phase value storing means) 94 is composed of the step 941, step 942, and step 943.

At step 951, the magnitude of the value of the variable k is compared with a specific value $k_{max}$ (here $k_{max}$ is an integer of 2 or more, or 2 preferably), and when the magnitude of the value of the variable k is greater, the processing of step 952 is effected. When the magnitude of the value of the variable k is not greater, the operation returns to the processing of step 921.

At step 952, the initial count value $c_o$ is calculated on the basis of the values stored in the store region M[n] (n=1, 2, ..., $k_{max}$). That is, by calculating the arithmetic mean of the value stored in the store region M[n], the initial count value $c_o$ is determined. Preferably, the arithmetic mean is calculated from an even number of stored values excluding the initial stored value M[1], and the initial count value $c_o$ is determined. More preferably, the initial count value $c_o$ is determined by calculating the arithmetic mean by using the stored values M[2] and M[3]. That is, the initial count value $c_o$ is determined as $$c_o = (M[2] + M[3])/2 \quad (7)$$

Then the operation returns to the processing of step 71 in FIG. 7.

Here, the initial phase calculating part (initial phase calculating means) 95 is composed of the step 951 and step 952.

By processing in this way, the position of the permanent magnet rotor 19 can be detected, and moreover the rotation amount of the permanent magnet rotor 19 at the time of detection may be greatly decreased. This point is further described below.

In the above configuration, the phase value increasing or decreasing part 92 decreases the first phase value f1 when the rotating direction of the permanent magnet rotor 19 is the normal direction, and increases the first phase value f1 in the reverse rotation. In the waveform generating unit 16, the position signal is output depending on the first phase value f1, and therefore the magnetomotive force vector I rotates reversely when the magnetic pole vector Φ rotates normally, and rotates normally when the magnetic pole vector Φ rotates reversely. That is, the magnetomotive force vector rotates in the reverse direction to the rotating direction of the permanent magnet rotor 19.

Figure 10A:
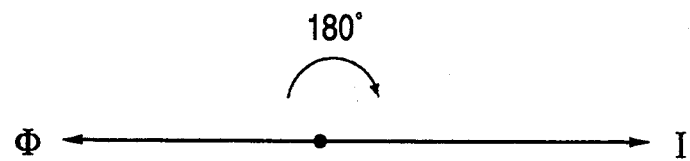
FIG. 10(a) is a vector diagram showing a relationship of the magnetic pole vector Φ with respect to the magnetomotive force vector I for explaining the rotation amount during the phase adjusting operation when the magnetomotive force vector is fixed.
Figure 10B:
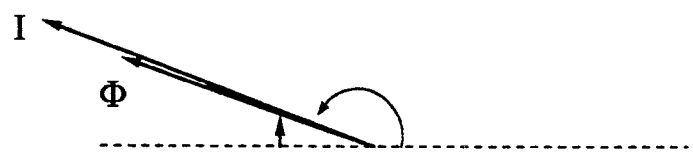
FIG. 10(b) is a vector diagram showing a relation of the magnetic pile vector Φ with respect to the magnetomotive force vector I for explaining the rotation amount during the phase adjusting operation when the magnetomotive force vector is varied.

Suppose the magnetomotive force vector I is output in a specific phase without rotating reversely to the rotating direction of the permanent magnet rotor 19, as shown in FIG. 10(a), the magnetic pole vector Φ rotates by mutual action with the magnetomotive force vector I, and finally both vectors coincide. As a result, the position of the magnetic pole vector Φ is detected. However, depending on its initial position, the permanent magnet rotor 19 rotates a maximum of 180 degrees (FIG. 10(a)). In the embodiment of the invention, the magnetomotive force I is rotated in the reverse direction of the rotating direction of the permanent magnet rotor 19. Accordingly, the magnetomotive force vector I and the magnetic pole vector I are matched in phase by a small rotation of the magnetic pole vector Φ. This mode is shown in FIG. 10(b). That is, by rotating the magnetomotive force vector I in the reverse direction of the rotating direction of the magnetic pole vector Φ, the magnetic pole vector Φ and the magnetomotive force vector I are matched while the rotation amount of the magnetic pole vector Φ is small, and therefore the position of the magnetic pole vector Φ may be detected in an extremely small state of rotation amount of the magnetic pole vector Φ.

By the above processing, if there is a load torque in the permanent magnet rotor 19, the position of the permanent magnet rotor 19 may be detected at high precision. This point is further described below.

Figure 11A:
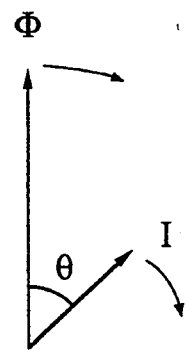
FIG. 11(a) is a vector diagram showing a phase difference between the magnetic pole vector Φ and the magnetomotive force vector I during the normal rotation of the brushless DC motor.
Figure 11B:
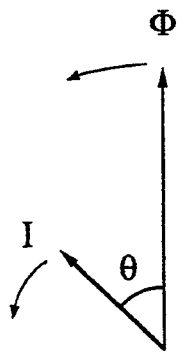
FIG. 11(b) is a vector diagram showing a phase difference between the magnetic pole vector Φ and the magnetomotive force vector I during the reverse rotation of the brushless DC motor.

Suppose the magnetomotive force vector I is generated in a specific phase. When the load torque of the permanent magnet rotor 19 is not zero, the magnetomotive force vector I and the magnetic pole vector Φ are not matched, and a phase angle $\theta$ depending on the magnitude of the load torque is maintained. The phase deviation direction is as follows: when the permanent magnet rotor 19 rotates in normal direction, as shown in FIG. 11(a), the magnetic pole vector Φ is deviated by the angle $\theta$ in the reverse direction from the magnetomotive force vector I, and when the permanent magnet rotor 19 rotates in the reverse direction, as shown in FIG. 11(b), the magnetic pole vector Φ is deviated by the angle $\theta$ in the normal direction from the magnetomotive force vector I.

Therefore, when the permanent magnet rotor 19 is loaded, only bypassing the specified phase current to the stator winding, the position of the permanent magnet rotor 19 cannot be detected accurately.

In the embodiment of the invention, by rotating and driving the magnetomotive force vector I in the normal or reverse direction depending on the rotating direction of the permanent magnet rotor 19, the initial count value $c_o$ corresponding to the position of the permanent magnet rotor 19 is calculated. Accordingly, the position of the permanent magnet rotor 19 may be detected at high precision. This point is further described below.

Figure 12A:
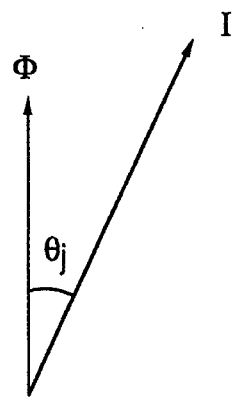
FIG. 12(a) a vector diagram showing a phase difference between the magnetic pole vector Φ and the magnetomotive force vector I at j-th inversion of the rotating direction of the brushless DC motor, and FIG. 12(b) a vector diagram showing a phase difference between the magnetic pole vector Φ and the magnetomotive force vector I at (j+1)-th inversion of the rotating direction of the brushless DC motor.
Figure 12B:
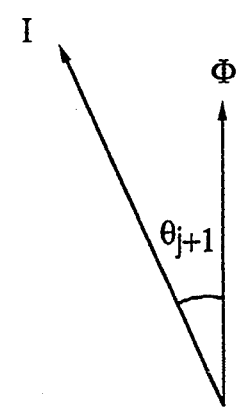

In this configuration, the magnetomotive force vector I is rotated in the reverse direction to the rotating direction of the permanent magnet rotor 19. Besides, every time the rotating direction of the permanent magnet rotor 19 is changed, the first phase value f1 is saved in the phase value storing unit 94. FIG. 12(a) shows the mode of the magnetomotive force vector I and magnetic pole vector Φ at the time of the j-th inversion of the rotating direction. In FIG. 12(a), the magnetic pole vector Φ is rotating counterclockwise, but receives the torque in the clockwise rotation by the mutual actions with the magnetomotive force vector I, and the moment of changing the rotating direction to the clockwise rotation is shown. At the j+1-th (next to the j-th) inversion of the rotating direction, the mode of the magnetomotive force vector I and magnetic pole vector Φ is shown in FIG. 12(b). In FIG. 12(b), the magnetic pole vector Φ is rotating clockwise, but receives the torque in the counterclockwise rotation by the mutual action with the magnetomotive force vector I, and the moment of changing the rotating direction to the counterclockwise rotation is shown. Supposing here the value of the first phase value f1 corresponding to the position of the magnetic pole vector Φ to be $\theta_o$, the value of the first phase value f1 corresponding to the phase angle of the magnetomotive force vector I and the magnetic pole vector Φ in FIG. 12(a) to be $\theta_j$, and the value of the first phase value f1 corresponding to the phase angle of the magnetomotive force vector I and the magnetic pole vector Φ in FIG. 12(b) to be $\theta_{j+1}$, the stored value M[j] is as follows:

$$\left. \begin{array}{l} M[j] = \theta_o + \theta_j \\ M[j+1] = \theta_o - \theta_{j+1} \end{array} \right\} \quad (8)$$

where j is a positive odd number.

Calculating the phase value calculating unit 95, it yields $$\begin{aligned} c_o &= (M[2] + M[3])/2 \\ &= ((\theta_o + \theta_2) + (\theta_o - \theta_3))/2 \\ &= \theta_o + (\theta_2 - \theta_3)/2 \end{aligned} \quad (9)$$

By repeating the inverting actions of the permanent magnet rotor 19, the magnitude of the phase angle $\theta_j$ and the magnitude of the phase angle $\theta_{j+1}$ are nearly equal. Hence, it follows that $$\theta_2 = \theta_3 \quad (10)$$

and hence $$c_o = \theta_o \quad (11)$$

Thus, the initial count value $c_o$ of the counter unit 14 is obtained.

Besides, since the initial count value $c_o$ is calculated from the stored values M[k] (k=1, 2, ..., $k_{max}$) of the first phase value f1 at the time of rotation of the permanent magnet rotor 19 in normal or reverse direction, if the load torque increases, only the magnitude of $\theta_j$ or $\theta_{j+1}$ in equation (8) or (9) increases, and the effect of the load torque may be eliminated by the calculation of equation (9).

In the embodiment, moreover, the initial count value $c_o$ is calculated by using the stored values M[2] and M[3] of the phase value storing unit 94, in particular. Since the value of the stored value M[1] depends greatly on the initial phase difference of the magnetic pole vector Φ and the magnetomotive force vector I, if the stored value M[1] is included in the calculation of the initial count value $c_o$, a large error is caused in the position detection of the magnetic pole vector Φ in the event of a large initial phase difference. Besides, when using the value after the stored value M[4], the specified value $k_{max}$ must be set in a large value. In this case, many inverting actions of the permanent magnet rotor 19 are required, and the phase matching time is substantially extended. In this embodiment, by using the stored values M[2] and M[3], elevation of position detecting precision and shortening of the phase matching time are both realized.

It is also possible to enhance the position detection precision by using multiple stored values.

By such operation of the phase matching mode, the initial count value of the counter unit 14 may be detected even by a small rotation amount of the permanent magnet rotor 19. Or even when the permanent magnet rotor 19 is loaded, the position of the permanent magnet rotor 19 may be detected at a high precision.

Besides, while the rotation of the permanent magnet rotor 19 is stopped, by holding the count value in the counter unit 14, it is not necessary to match the phase again when resuming operation, so that starting is possible in a short time. Moreover, by allowing the frequency generator to issue signals even when the rotation of the permanent magnet rotor 19 is stopped, if the permanent magnet rotor 19 is rotated by an external factor during stopping, the count value in the counter unit 14 is updated depending on the rotation, so that it is not necessary to match the phase except when turning on the power source.

Thus, since the brushless DC motor driving apparatus of the invention produces three-phase position signals on the basis of two-phase frequency signals mutually different in phase as produced by the frequency generator, it is not necessary to use a position sensor such as a Hall effect sensor.

Meanwhile, in the memory means 62 relating to the embodiment, by storing the function table of a sinusoidal wave of one period only in the memory, the address value is changed by the portion of only the different phase and the function table is referred to, and therefore the three-phase position signals are delivered to three D/A converters 63, 64, and 65 as shown in FIG. 6. However, needless to say, it is possible to convert into analog values sequentially by using only one D/A converter, hold the obtained analog values in three sample and hold circuits, and produce three-phase position signals. Moreover, instead of storing the function table of a sinusoidal wave of only one period in the memory, needless to say, it is possible to store the sinusoidal waves of three phases in individual function tables, and produce the digital signals corresponding to three-phase position signals directly in three D/A converters 63, 64, and 65. In the position matching mode, meanwhile, the rotating speed of the magnetomotive force vector I is nearly constant, but, the rotating speed may be variable. Still more, in the embodiment, a motor of three phases is used, but the number of phases is not limited to three, as a matter of fact. Various other modifications are possible without departing from the true spirit of the invention.

What is claimed is:

1. A brushless DC motor driving apparatus for driving a brushless DC motor which includes: comprising:
    a rotor possessing a plurality of magnetic poles;
    a stator; and
    a stator winding with plural phases disposed provided on the stator at a specific gap with respect to the rotor; said driving apparatus comprising:
    a sensor means for generating a sensor signals of plural phases showing a state of rotation of the rotor depending on the rotation of the rotor;
    a direction detecting means for detecting a rotating direction of the rotor from the sensor signals of plural phases and for producing a direction signal;
    an initial phase detecting means for issuing producing a first phase signal depending on the direction signal, and for detecting an initial count value corresponding to the position of the rotor by oscillating a rotary magnetic field generated in the stator winding in normal and reverse directions;
    a counter means for setting therein an initial value corresponding to the initial count value, and for increasing or decreasing the count value depending on the direction signal and at least one of the sensor signals and the direction signal, and for producing a second phase signal;
    a waveform generating means for generating a position signal of plural phases depending on the first phase signal or second phase signal; and
    a power supply means for supplying an electrical power to the stator winding depending on the position signal of plural phases.

2. A brushless DC motor driving apparatus according to claim 1, wherein the initial phase detecting means comprises:
    phase a signal increasing or decreasing means for increasing or decreasing the first phase signal depending on the direction signal;
    phase a signal storing means for storing a plurality of the first phase signals depending on a change of the direction signal; and
    an initial phase calculating means for calculating the initial count value from at least two first phase signals stored in the phase value storing means.

3. A brushless DC motor driving apparatus according to claim 1, wherein the waveform generating means comprises:
    selecting means for a selecting either the first phase signal or the second phase signal to obtain a selected phase signal; and
    a position signal generating means for generating the position signal of plural phases depending on the selected phase signal.

4. A brushless DC motor driving apparatus according to claim 3, wherein the position signal generating means comprises:
    a memory means having sinusoidal signals preliminarily stored therein;
    a position signal output means for obtaining sinusoidal signals of plural phases stored in the memory means depending on the selected phase signal; and
    a means for producing the position signal of plural phases from the sinusoidal signals of plural phases obtained by the position signal output means.

5. A brushless DC motor driving apparatus according to claim 4, wherein the memory means has sinusoidal signals preliminarily stored therein of one period or ½ period or ¼ period.

6. A brushless DC motor driving apparatus according to claim 1, wherein the counter means comprises:
    an initial value setting means for setting the initial value depending on the initial count value;
    a count value increasing or decreasing means for increasing or decreasing the count value depending on the direction signal and at least one of the sensor signals; and a phase adjusting means for adding or subtracting a specific value to or from the count value of the count value increasing or decreasing means depending on a rotating direction command.

7. A brushless DC motor driving apparatus according to claim 6, wherein the phase adjusting means rotates a phase of a rotary magnetic field generated by the stator winding by adding or subtracting the count value of the count value increasing or decreasing means depending on the rotating direction command, by an electric angle of 90 degrees from a phase of a magnetic pole of the permanent magnet rotor.

8. A brushless DC motor driving apparatus according to claim 1, wherein the sensor means generates a sensor signal showing a state of the rotor when the rotor is stopped.

9. A brushless DC motor driving apparatus according to claim 1, wherein the initial phase detecting means operates only when a power source is turned on.

10. A brushless DC motor driving apparatus according to claim 1, wherein operations of the counter means, initial phase detecting means and waveform generating means are performed by an arithmetic unit comprising:
a memory means for storing a specified processing program; and
an arithmetic means for executing processings according to the specified processing program.

* * * * *